(12) United States Patent
Downey

(10) Patent No.: US 8,556,029 B2
(45) Date of Patent: Oct. 15, 2013

(54) NOISE AND VIBRATION MITIGATING MAT

(76) Inventor: Paul C. Downey, Toronto (CA)

( * ) Notice: Subject to any disclaimer, the term of this patent is extended or adjusted under 35 U.S.C. 154(b) by 0 days.

(21) Appl. No.: 13/556,731

(22) Filed: Jul. 24, 2012

(65) Prior Publication Data

US 2012/0325577 A1    Dec. 27, 2012

Related U.S. Application Data

(63) Continuation of application No. 13/223,339, filed on Sep. 1, 2011, now Pat. No. 8,240,430, which is a continuation of application No. 11/096,589, filed on Apr. 1, 2005, now abandoned, which is a continuation-in-part of application No. PCT/US03/31348, filed on Oct. 1, 2003.

(60) Provisional application No. 60/415,054, filed on Oct. 1, 2002.

(51) Int. Cl.
*E04B 1/82* (2006.01)

(52) U.S. Cl.
USPC .......................... 181/290; 181/284; 181/286

(58) Field of Classification Search
USPC .................. 181/290, 284, 286; 52/309.13
See application file for complete search history.

(56) References Cited

U.S. PATENT DOCUMENTS

| | | | |
|---|---|---|---|
| 1,554,179 A | 9/1925 | Trader | |
| 1,940,105 A | 12/1933 | Schmid | |
| 2,001,916 A | 5/1935 | Mazer | |
| 2,077,617 A | 4/1937 | Cramer | |
| 2,270,902 A | 1/1942 | Rubissow | |
| 2,288,054 A | 6/1942 | Walton | |
| 2,290,622 A | 7/1942 | Carter | |
| 2,337,525 A | 12/1943 | Peik | |
| 2,665,848 A | 1/1954 | Smith et al. | |
| 2,768,091 A | 10/1956 | Cubberley | |
| 2,821,254 A | 1/1958 | Kernen | |
| 2,862,255 A | 12/1958 | Nelson | |
| 2,940,887 A | 6/1960 | Daly et al. | |
| 2,961,029 A | 11/1960 | Rainar | |
| 3,026,224 A | 3/1962 | Rogers, Jr. | |
| 3,160,549 A | 12/1964 | Caldwell et al. | |
| 3,311,331 A | 3/1967 | Steimen | |

(Continued)

FOREIGN PATENT DOCUMENTS

| | | |
|---|---|---|
| DE | 3407031 | 9/1985 |
| DE | 4141023 | 6/1993 |

(Continued)

OTHER PUBLICATIONS

Vibration Insulation, Technical Data for Regupol 6010 BA, SH, PL, HT, XHT, MF brochure, undated, 28 pages.

(Continued)

*Primary Examiner* — Forrest M Phillips
(74) *Attorney, Agent, or Firm* — Tarolli, Sundheim, Covell & Tummino LLP

(57) ABSTRACT

A noise and vibration mitigating mat having top and bottom surfaces comprises a first layer formed of recycled bound rubber product, the first layer having a contoured bottom surface and a generally flat top surface, a second layer on the top surface of the first layer, the second layer being formed of a fabric and a third layer on the second layer and being formed of recycled rubber product.

14 Claims, 4 Drawing Sheets

(56) References Cited

U.S. PATENT DOCUMENTS

| | | |
|---|---|---|
| 3,345,245 A | 10/1967 | Hanusa |
| 3,399,103 A | 8/1968 | Salyer et al. |
| 3,418,812 A | 12/1968 | Khan et al. |
| 3,567,563 A | 3/1971 | Haudenchild at al. |
| 3,579,941 A | 5/1971 | Tibbals |
| 3,641,855 A | 2/1972 | Balle |
| 3,770,560 A | 11/1973 | Elder et al. |
| 3,893,619 A | 7/1975 | Bruner |
| 3,917,501 A | 11/1975 | Ferrucci et al. |
| 3,924,907 A | 12/1975 | Czernik et al. |
| 3,948,009 A | 4/1976 | Bernhard |
| 3,985,198 A | 10/1976 | Kurtze et al. |
| 4,002,315 A | 1/1977 | Van Goubergen |
| 4,060,502 A | 11/1977 | Benton |
| 4,112,176 A | 9/1978 | Bailey |
| 4,143,495 A | 3/1979 | Hintz |
| 4,179,067 A | 12/1979 | Baier |
| 4,190,131 A | 2/1980 | Robinson |
| 4,242,391 A | 12/1980 | Reinhardt et al. |
| 4,244,841 A | 1/1981 | Frankland |
| 4,265,398 A | 5/1981 | Luebke |
| 4,428,454 A | 1/1984 | Capaul et al. |
| 4,457,120 A | 7/1984 | Takata |
| 4,500,037 A | 2/1985 | Braitsch et al. |
| 4,551,362 A | 11/1985 | Harms et al. |
| 4,566,231 A | 1/1986 | Konsevich |
| 4,637,942 A | 1/1987 | Tomarin |
| 4,672,100 A | 6/1987 | Schonbachler et al. |
| 4,681,786 A | 7/1987 | Brown |
| 4,685,259 A | 8/1987 | Eberhart et al. |
| 4,694,627 A | 9/1987 | Omholt |
| 4,696,429 A | 9/1987 | Ortwein |
| 4,720,043 A | 1/1988 | Ortwein |
| 4,753,841 A | 6/1988 | Noel et al. |
| 4,755,408 A | 7/1988 | Noel |
| 4,771,944 A | 9/1988 | Brister et al. |
| 4,803,112 A | 2/1989 | Kakimoto et al. |
| 4,851,500 A | 7/1989 | Lalwani et al. |
| 4,860,506 A | 8/1989 | Yoshimi et al. |
| 4,888,927 A | 12/1989 | Yoshimi et al. |
| 4,910,935 A | 3/1990 | Leukel et al. |
| 4,917,932 A | 4/1990 | McClung |
| 4,945,697 A | 8/1990 | Ott et al. |
| 4,957,798 A | 9/1990 | Bogdany |
| 4,967,529 A | 11/1990 | L'Heureux |
| 5,016,413 A | 5/1991 | Counihan |
| 5,060,856 A | 10/1991 | Ortwein |
| 5,096,772 A | 3/1992 | Snyder |
| 5,110,660 A | 5/1992 | Wolf et al. |
| 5,183,438 A | 2/1993 | Blom |
| 5,187,905 A | 2/1993 | Pourtau et al. |
| 5,258,222 A | 11/1993 | Crivelli |
| 5,383,314 A | 1/1995 | Rothberg |
| 5,424,099 A | 6/1995 | Stewart et al. |
| 5,438,171 A | 8/1995 | Schmanski |
| 5,439,735 A | 8/1995 | Jamison |
| 5,472,750 A | 12/1995 | Miller |
| 5,482,754 A | 1/1996 | Crook |
| 5,487,501 A | 1/1996 | Engst et al. |
| 5,527,409 A | 6/1996 | Lanphier |
| 5,572,842 A | 11/1996 | Stief et al. |
| 5,584,950 A | 12/1996 | Gaffigan |
| 5,619,832 A | 4/1997 | Myrvold |
| 5,653,099 A | 8/1997 | MacKenzie |
| 5,714,219 A | 2/1998 | Mashunkashey et al. |
| 5,721,035 A | 2/1998 | Dunn |
| 5,738,279 A | 4/1998 | Ihle et al. |
| 5,744,763 A | 4/1998 | Iwasa et al. |
| 5,766,721 A | 6/1998 | Bussey, Jr. et al. |
| 5,851,338 A | 12/1998 | Pushaw |
| 5,867,957 A | 2/1999 | Holtrop |
| 5,873,936 A | 2/1999 | Ogden |
| 5,879,781 A | 3/1999 | Mehta et al. |
| 5,956,921 A | 9/1999 | Fleck et al. |
| 6,077,613 A | 6/2000 | Gaffigan |
| 6,182,413 B1 | 2/2001 | Magnusson |
| 6,212,838 B1 | 4/2001 | Eda |
| 6,213,252 B1 * | 4/2001 | Ducharme ............... 181/293 |
| 6,224,707 B1 | 5/2001 | Lion |
| 6,235,367 B1 | 5/2001 | Holmes et al. |
| 6,251,493 B1 | 6/2001 | Johnson et al. |
| 6,256,955 B1 | 7/2001 | Lolley et al. |
| 6,291,048 B1 | 9/2001 | Jerdee et al. |
| 6,372,069 B1 | 4/2002 | Walls |
| 6,386,461 B1 | 5/2002 | Wildgoose |
| 6,427,925 B1 | 8/2002 | Gaudet |
| 6,468,631 B1 | 10/2002 | Pahl et al. |
| 6,481,637 B1 | 11/2002 | McQueen |
| 6,541,105 B1 | 4/2003 | Park |
| 6,595,321 B1 | 7/2003 | Tompson |
| 6,602,586 B2 | 8/2003 | Kakimoto et al. |
| 6,708,896 B2 | 3/2004 | Robinson |
| 6,723,413 B2 | 4/2004 | Walters |
| 6,769,834 B1 | 8/2004 | Stange |
| 6,786,852 B2 | 9/2004 | Watterson et al. |
| 6,796,096 B1 | 9/2004 | Heath |
| 6,920,723 B2 | 7/2005 | Downey |
| 6,945,007 B2 | 9/2005 | Kobayashi et al. |
| 6,990,703 B2 | 1/2006 | Brown et al. |
| 7,055,649 B2 | 6/2006 | Tompson et al. |
| 7,080,712 B2 | 7/2006 | Tsuiki et al. |
| 7,096,630 B1 | 8/2006 | Keene et al. |
| 7,166,678 B2 | 1/2007 | Dunlap et al. |
| 7,182,994 B1 | 2/2007 | Scott |
| 7,263,028 B2 | 8/2007 | Thomas et al. |
| 7,265,178 B2 | 9/2007 | Maier et al. |
| 7,278,588 B2 | 10/2007 | English et al. |
| 7,331,534 B2 | 2/2008 | McQueen |
| 7,464,791 B2 | 12/2008 | Cooksey et al. |
| 7,566,374 B2 | 7/2009 | Brazier et al. |
| 7,730,684 B1 | 6/2010 | Keene |
| 7,730,685 B1 | 6/2010 | Keene |
| 7,770,693 B2 * | 8/2010 | Uejima ............. 181/294 |
| RE41,945 E | 11/2010 | Downey |
| 7,987,645 B2 * | 8/2011 | Tinianov ............. 52/403.1 |
| 8,230,969 B2 * | 7/2012 | Frederick et al. ............. 181/293 |
| 2001/0052550 A1 | 12/2001 | Janssens |
| 2002/0005250 A1 | 1/2002 | Jerdee et al. |
| 2002/0015840 A1 | 2/2002 | Kakimoto et al. |
| 2002/0040079 A1 | 4/2002 | Lee et al. |
| 2002/0074075 A1 | 6/2002 | Brown et al. |
| 2002/0088193 A1 | 7/2002 | Reimers et al. |
| 2002/0119716 A1 | 8/2002 | Santhosh |
| 2003/0033779 A1 | 2/2003 | Downey |
| 2003/0037508 A1 | 2/2003 | Kobayashi et al. |
| 2003/0040405 A1 | 2/2003 | Watterson et al. |
| 2003/0102184 A1 | 6/2003 | Brisson et al. |
| 2004/0050482 A1 | 3/2004 | Abrams |
| 2004/0055813 A1 | 3/2004 | Tsuiki et al. |
| 2004/0096645 A1 | 5/2004 | Hancy et al. |
| 2004/0123555 A1 | 7/2004 | Cole |
| 2004/0127614 A1 | 7/2004 | Jiang et al. |
| 2004/0202854 A1 | 10/2004 | Esparza |
| 2005/0023080 A1 | 2/2005 | Tompson et al. |
| 2005/0031829 A1 * | 2/2005 | Crenshaw et al. ............. 428/95 |
| 2005/0032447 A1 | 2/2005 | Tachibana et al. |
| 2005/0037174 A1 | 2/2005 | Streeton et al. |
| 2005/0098648 A1 | 5/2005 | McQueen |
| 2005/0126848 A1 | 6/2005 | Siavoshai et al. |
| 2005/0221039 A1 * | 10/2005 | Dunlap et al. ............... 428/36.9 |
| 2005/0282465 A1 | 12/2005 | McNab |
| 2006/0008612 A1 | 1/2006 | Brazier et al. |
| 2006/0016635 A1 | 1/2006 | Downey |
| 2006/0024453 A1 | 2/2006 | Setser et al. |
| 2006/0037815 A1 | 2/2006 | Schabel, Jr. |
| 2006/0072372 A1 | 4/2006 | Thomas et al. |
| 2006/0097064 A1 | 5/2006 | English et al. |
| 2006/0105136 A1 | 5/2006 | Brazier et al. |
| 2006/0151908 A1 | 7/2006 | Brazier et al. |
| 2006/0156663 A1 | 7/2006 | Mao |
| 2006/0162997 A1 | 7/2006 | Cooksey et al. |
| 2006/0165950 A1 | 7/2006 | Dodge, III |
| 2006/0167206 A1 | 7/2006 | Maier et al. |
| 2006/0189750 A1 | 8/2006 | Maier et al. |

(56) References Cited

U.S. PATENT DOCUMENTS

| | | | |
|---|---|---|---|
| 2006/0191743 A1 | 8/2006 | Pike, Sr. et al. | |
| 2006/0205869 A1 | 9/2006 | Steidl et al. | |
| 2006/0230699 A1 | 10/2006 | Keene | |
| 2007/0004306 A1 | 1/2007 | Leeser et al. | |
| 2007/0172629 A1 | 7/2007 | Dodge | |
| 2007/0261365 A1 | 11/2007 | Keene | |
| 2008/0010930 A1 | 1/2008 | Mao | |
| 2009/0283658 A1 | 11/2009 | Keene | |
| 2010/0229486 A1* | 9/2010 | Keene | 52/403.1 |
| 2011/0107700 A1 | 5/2011 | Keene | |
| 2011/0314589 A1* | 12/2011 | Vito et al. | 2/181 |

FOREIGN PATENT DOCUMENTS

| | | |
|---|---|---|
| DE | 19932991 | 6/2000 |
| EP | 0916629 | 5/1999 |
| EP | 0982444 | 3/2000 |
| EP | 1447495 | 8/2004 |
| EP | 1739253 | 3/2007 |
| EP | 1757750 | 4/2010 |
| FR | 2503206 | 10/1982 |
| FR | 2824094 | 10/2002 |
| GB | 841867 | 7/1960 |
| GB | 1120827 | 7/1968 |
| GB | 2379934 | 3/2003 |
| GB | 2428698 | 2/2007 |
| GB | 2437180 | 10/2007 |
| JP | 48014737 | 2/1973 |
| JP | 8297492 | 11/1996 |
| WO | 8302127 | 6/1983 |
| WO | 8700828 | 2/1987 |
| WO | 9312283 | 6/1993 |
| WO | 9966144 | 12/1999 |
| WO | 0155530 | 8/2001 |
| WO | 0235025 | 5/2002 |
| WO | 02094550 | 11/2002 |
| WO | 2004031501 | 4/2004 |
| WO | 2004058416 | 7/2004 |
| WO | 2006131138 | 12/2006 |
| WO | 2007015081 | 2/2007 |
| WO | 2007082339 | 7/2007 |

OTHER PUBLICATIONS

Vibration Technology, Dodge-Regupol Inc., undated, 2 pages.
Letter dated Mar. 5, 2008 from Harness Dickey re: *Dodge-Regupol, Inc.* v. *RB Rubber Products*, Inc. Case No. 3:06cv236, 5 pages.
Case 3:06cv00236-JEJ-Document 48 (Markman Order) Filed Mar. 9, 2007, 12 pages.
United States District Court, Middle District of Pennsylvania (Scranton), Civil Docket for Case No. 3:06cv00236-JEJ, filed Jan. 31, 2006, 9 pages.
Deposition of Paul Downey, Jun. 27, 2007, 71 pages.
Deposition of Paul Downey, Jun. 27, 2007, Exhibits 1, 3-7 & 9-12, 78 pages.
Deposition of Paul Downey, Apr. 24, 2008, vol. II, 97 pages.
Downey Exhibits, 13-42, Jun. 27, 2007, 130 pages.
Deposition of Arthur Dodge, Jun. 27, 2007, 30 pages.
Dodge Exhibits, 1-2, Jun. 27, 2007, 24 pages.
Videotapbed Deposition of Art Dodge, Apr. 25, 2008, vol. II, 83 pages.
Dodge Depositions 2008, Exhibits 3-27, 82 pages.
Transcript of Deposition of Paul C. Downey, Apr. 24, 2008, 7 pages.
Transcript of Deposition of Art Dodge, vol. II, Apr. 25, 2008, 12 pages.
Exhibits 3-6 to the Deposition of Art Dodge, vol. II, Apr. 25, 2008, 4 pages.
Exhibits 17-21 to the Deposition of Art Dodge, vol. II, Apr. 25, 2008, 9 pages.

* cited by examiner

NOISE AND VIBRATION MITIGATING MAT

CROSS-REFERENCE TO RELATED APPLICATIONS

This application is a continuation of U.S. patent application Ser. No. 13/223,339, filed on Sep. 1, 2011, which is a continuation of U.S. patent application Ser. No. 11/096,589, filed on Apr. 1, 2005, which is a continuation-in-part of International PCT Application No. PCT/US2003/031348 filed on Oct. 1, 2003 and published under No. WO 2004/031501 on Apr. 15, 2004, designating the United States, which claims the benefit of U.S. Provisional Patent Application No. 60/415,054 filed on Oct. 1, 2002.

FIELD OF THE INVENTION

The present invention relates generally to sound absorption, and more particularly to a noise and vibration mitigating mat for mitigating impact generated and structure borne noise.

BACKGROUND OF THE INVENTION

In many situations, noise is generated on horizontal surfaces such as floors or road surfaces due to various impacts. This noise often propagates into surrounding structures creating undesirable noise and vibration pollution. For example, a truck passing over a road generates impact noise. Such impact noise typically travels through the road and then to adjacent structures. Likewise, machinery, which vibrates during use, often results in impact and/or vibrational noise passing through the floor and into adjacent structures. Similarly, locomotives and railcars passing over tracks generate impact and vibrational noise, which passes into the ground and potentially into adjacent structures such as homes, roads or bridges. Mitigating impact and vibrational noise generated by locomotives and railcars is especially problematic due to the relatively large axle loads of locomotives and railcars on the tracks.

As mentioned above, impact noise and vibrations generated under the above and similar conditions is undesirable due to the noise and vibration pollution created in adjacent and surrounding structures. As will be appreciated, it is desirable to mitigate the affects of impact and vibrations on surrounding structures.

It is therefore an object of the present invention to provide a novel noise and vibration mitigating mat.

SUMMARY OF THE INVENTION

Accordingly, in one aspect there is provided a noise and vibration mitigating mat having top and bottom surfaces comprising:
  a first layer formed of recycled bound rubber product, the first layer having a contoured bottom surface and a generally flat top surface;
  a second layer on the top surface of said first layer, the second layer being formed of a fabric; and
  a third layer on the second layer and being formed of recycled rubber product.

In one embodiment, the contoured bottom surface has variations in thickness and comprises an array of peaks and valleys. The dimensions of the peaks and valleys and the relative densities of the first and third layers are selected to give the mat a desired dynamic compression characteristic under load.

The mat can be manufactured in a continuous sheet with the first and third layers being cut from large cylindrical members formed of Styrenebutadiene Rubber (SBR) and natural rubber mixed with polyurethane. The first layer is processed by a profiling machine which cuts the contour into the bottom surface.

According to another aspect there is provided a noise and vibration mitigating mat comprising:
  a first layer defining a contoured bottom surface of said mat; and
  a second layer overlying said first layer and defining a generally flat top surface of said mat, wherein said first and second layers are formed of sound absorbing material so that impact and/or vibration energy applied to said mat is inhibited from propagating to structure surrounding said mat.

The noise and vibration mitigating map effectively absorbs noise and vibration inhibiting noise and vibration from propagating to surrounding structure. When used in certain environments, the contoured bottom surface also provides for effective drainage.

BRIEF DESCRIPTION OF THE DRAWINGS

Embodiments will now be described more fully with reference to the accompanying drawings in which.

DETAILED DESCRIPTION OF THE EMBODIMENTS

Figure 1A:
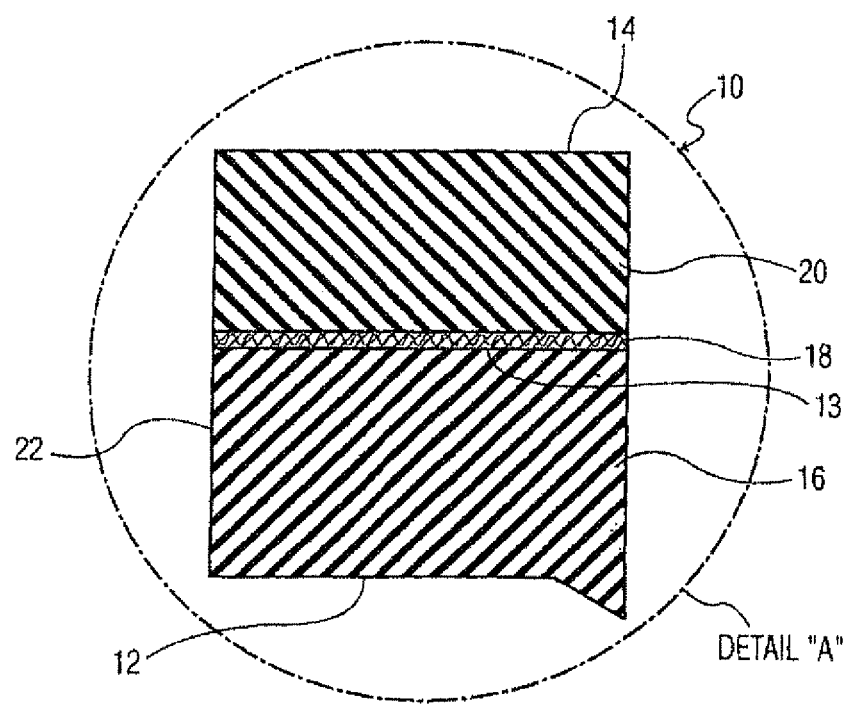
FIG. 1A is a partial side view of a noise and vibration mitigating mat.
Figure 1B:
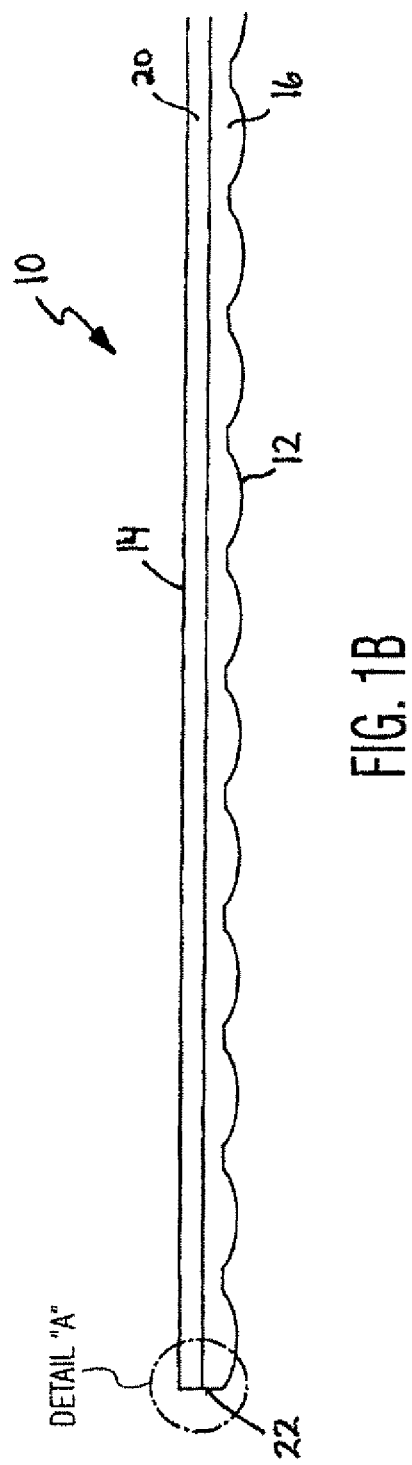
FIG. 1B is a cross-sectional view of the noise and vibration mitigating mat of FIG. 1.

Turning now to FIGS. 1A and 1B, a noise and vibration mitigating mat is shown and is generally identified by reference numeral 10. As can be seen, mat 10 has a bottom surface 12, a top surface 14 and sides 22 extending between the surface 12 and 14. The mat 10 can be produced in a continuous roll such that the surfaces 12 and 14 extend for a distance between the sides 22. The top surface 14 and the oppositely facing bottom surface 12 are generally parallel to each other and are spaced apart by an overall thickness. The bottom surface 12 is contoured such that the thickness varies between a minimum thickness $t_1$ measured at the minimum dimension of the contour and a maximum thickness t measured at the maximum dimension of the contour. As the mat 10 is manufactured in continuous sheets, the length of the mat 10 is governed by the particular installation. This provides flexibility during installation, and other advantages which will be more fully described below.

In this embodiment, the mat 10 comprises three layers 16, 18 and 20. The first or bottom layer 16 is formed of recycled bound rubber product and defines the contoured bottom surface 12. Layer 16 also has a flat top surface 13. The second or intermediate layer 18 is a relatively thin, flat layer formed of fabric or a reinforcing agent such as EE200-80 polyester polynylon blend, which is commercially available from several sources such as Allied Signal. Layer 18 is disposed on the top surface 13 of the layer 16. The third or top layer 20 is disposed on the intermediate layer 18 and is also formed of recycled rubber product. The layer 20 defines the flat top surface 14.

As mentioned above, the first and third layers 16 and 20 are manufactured from recycled rubber product. During the manufacturing process, Styrenebutadiene Rubber (SBR) and natural rubber are mixed with polyurethane and cured under moderate temperature to form large cylindrical rubber members. Although each layer 16 and 20 has a large percentage of SBR rubber therein, the mat 10 can be made of SBR rubber, other rubbers or a combination thereof. In order to provide a continuous sheet of material for each layer 16, 20, the layers are cut from the large cylindrical rubber members. As each cylindrical rubber member is rotated, blades engage an outside layer of the cylindrical rubber member and cause the outside layer to be cut away from the cylindrical rubber member thereby forming the respective continuous sheet. This process of manufacturing each layer 16 and 20 in the form of a continuous sheet is significantly different than known vulcanizing methods generally used to manufacture materials of this type. In manufacturing the mat 10, the first and third layers 16 and 20 are each manufactured having a desired number of voids which are randomly positioned within each layer. The material for the first layer 16 has a relatively low density as compared to the material for the third layer 20 and therefore has more voids. The third layer 20 is relatively more dense than the first layer 16 and contains fewer voids. The density of each layer is selected to result in a desired ratio of dynamic stiffness to static stiffness in the mat 10. This ratio is selected to result in a desired dynamic compression or deflection of the mat 10 under load. The contour of the bottom surface 12 also contributes to the dynamic compression characteristics of the mat 10 as will be further described below.

After the first layer 16 is cut from the large cylindrical rubber member, it is placed in a profiling machine that physically cuts or otherwise applies the required depth and pattern of the profile into the layer 16 thereby to form the contoured bottom surface 12. One such profile is shown in the cross-sectional view of FIG. 2. It should be understood that the resultant contoured bottom surface 12 may take many forms including ones that are relatively flat and ones that have large variation in thickness between $t_1$ and t. The mat 10 shown in FIGS. 1A and 1B has a contoured bottom surface 12 in the form of an egg crate wherein peaks and valleys are sequentially alternated in a three-dimensional array. The depth and pitch of the peaks and valleys can be varied to give the mat 10 the desired dynamic compression characteristic. For example, sharp and long peaks and valleys offer greater dynamic compression or deflection under relatively small loads while wide and short peaks and valleys result in less dynamic compression or deflection under relatively larger loads. The geometry of the profiled bottom surface 12 is therefore selected to result in a desired amount of compressive deflection under a given dynamic load. This dynamic compressive deflection serves to mitigate transfer of structure borne or impact noise.

The three layers 16, 18 and 20 are assembled either through a lamination machine or through a machine that mechanically or chemically bonds the layers together. The third layer 20 inhibits penetration of material through the mat 10 and the second layer 18 ensures uniform load distribution. The profiled bottom surface 12 provides generous drainage in addition to providing the mat 10 with the desired dynamic compression characteristic.

Figure 2:
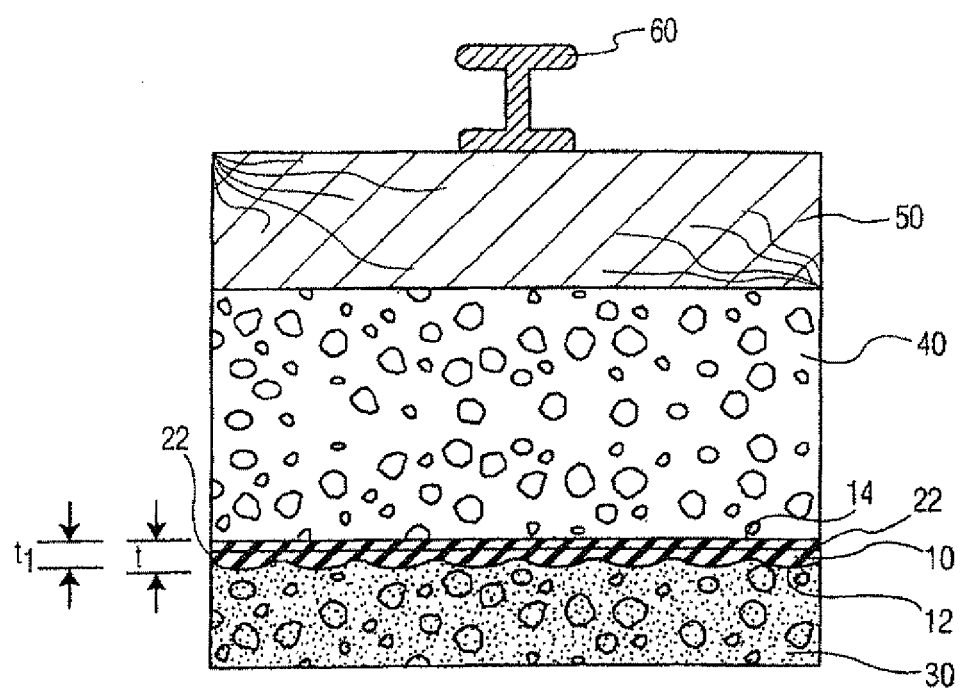
FIG. 2 is a cross-sectional view of the noise and vibration mitigating mat of FIG. 1 installed in a railway bed application.

An installation of the mat 10 placed in a railway bed is shown in FIG. 2. The railway bed comprises a packed earth, asphalt or concrete base 30 which is topped with the noise and vibration mitigating mat 10, ballast 40, railway ties 50, and rails 60. During the installation of the railway bed, a continuous roll of the mat 10 is unrolled in a continuous manner over the base 30. This may be accomplished through the use of spooling machinery. Since the rubber material of the mat 10 is not vulcanized, the rubber material has the flexibility required to allow it to be delivered in rolls. With the mat 10 properly positioned on the base 30, the ballast 40, railway ties 50 and rails 60 are then applied in a conventional manner.

The mat 10 in the railway bed installation serves to mitigate the transfer of structure borne or impact noise and vibration from the rails 60 into the base 30. As a freight railcar will generally weigh in the vicinity of forty (40) tons, the mat 10 in this environment is made stiff and thus, the profiled bottom surface 12 has relatively wide and short peaks and valleys. As will be appreciated, in other environments, the stiffness of the mat 10 and hence, the densities of the layers 16 and 20 and the profile of the bottom surface 12 will change.

The use of the mat 10 in the railway bed application provides advantages. The impact and sound absorption properties of the mat 10 inhibit fouling of the ballast 40 due to impact and vibration. Ballast fouling contributes to poor drainage and flooding of the railway bed. The contoured bottom surface 12 provides not only good noise and vibration absorption but also allows for effective drainage.

Figure 3A:
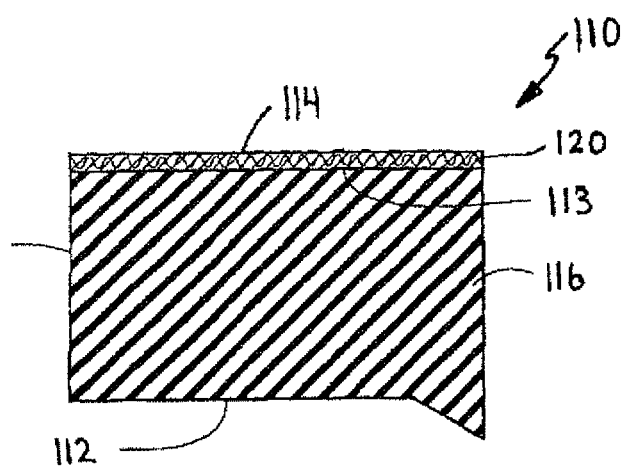
FIG. 3A is a partial side view of another embodiment of a noise and vibration mitigating mat.
Figure 3B:
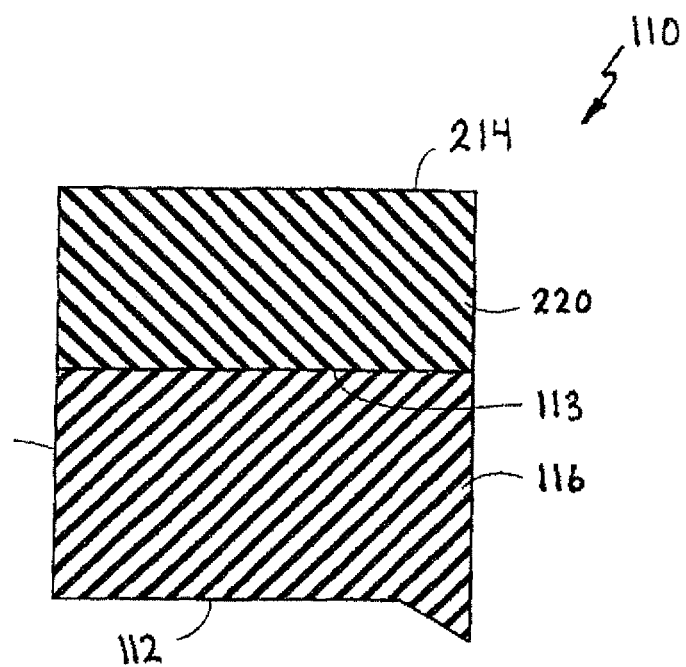
FIG. 3B is a partial side view of yet another embodiment of a noise and vibration mitigation mat.

Although the mat 10 is described as including three layers 16, 18 and 20, other layer configurations can be used. For example, the mat 110 can be constructed to include only two layers as shown in FIGS. 3A and 3B. In FIG. 3A, the bottom layer 116 is similar to that of the above-described embodiment and has a profiled bottom surface 112 and a generally flat upper surface 113. A thin upper layer 120 formed of geotextile, fabric, polyethylene or polypropylene plastic or asphalt mastic material is disposed on the bottom layer 116 and defines the top flat surface 114 of the mat 110. The geotextile material is a non-woven fabric formed of nylon or polyester available from Allied Signal. The polyethylene plastic is available from Noble and the polypropylene plastic is available from Dow. The asphalt mastic material is available from Protecto-Wrap. In FIG. 3B, the upper layer 220 defining the top flat surface 214 of the mat 110 is thicker and is formed of rebound rubber product or other similar material. Of course, the mat 10 may include more than three layers with the bottom, intermediate and top layers being formed of the above-identified materials or other similar materials.

Although the mat 10 is shown in a railway bed application in FIG. 2, those of skill in the art will appreciate that the mat may be used in a variety of applications. For example, the mat may be used in commercial and industrial applications as well as in residential applications. In commercial and industrial environments, the mat 10 may be placed beneath machines and equipment such as HVAC equipment that vibrate during use thereby to inhibit the transfer of machine and equipment vibration to surrounding structures. In residential environments, the mat may be used in floor surfaces of multi-family residences to inhibit the transfer of impact noise to surrounding structure. In the above-environments, gypsum concrete, portland cement concrete, self-leveling concrete and/or other hard rock materials may overlie the mat.

Embodiments of the noise and vibration mitigating mat have been described above with reference to the drawings. Those of skill in the art will however appreciate that variations and modifications may be made without departing from the spirit and scope thereof as defined by the appended claims.

What is claimed is:

1. A noise and vibration mitigating mat having top and bottom surfaces comprising:
   a first layer formed of recycled bound rubber product, the first layer having a contoured bottom surface and a generally flat top surface, said contoured bottom surface defining the bottom surface of said mat and having an egg crate configuration defining an array of peaks and valleys, the depth and pitch of the peaks and valleys providing the mat with a selected compression characteristic under load;
   a second layer directly on the top surface of said first layer, the second layer being formed of a fabric; and
   a third layer directly on the second layer and being formed of recycled rubber product, said third layer having a generally planar upper surface defining the top surface of said mat.

2. A noise and vibration mitigating mat according to claim 1 wherein the contoured bottom surface has variations in thickness depth and pitch of the peaks and valleys varies over said bottom surface.

3. A noise and vibration mitigating mat according to claim 2 wherein the first and third layers are cut from large cylindrical members each formed of Styrenebutadiene Rubber (SBR) and natural rubber mixed with a polyurethane to form a plurality of voids therein.

4. A noise and vibration mitigating mat according to claim 3 wherein the density of the third layer is greater than the density of the first layer.

5. A noise and vibration mitigating map according to claim 1 wherein said first and third layers are formed of Styrenebutadiene Rubber and natural rubber mixed with polyurethane.

6. A noise and vibration mitigating map according to claim 5 wherein said second layer is selected from the group consisting of geotextile, fabric, polyethylene plastic, polypropylene plastic and asphalt mastic material.

7. A noise and vibration mitigating mat comprising:
   a first layer defining having a generally flat top surface and a contoured bottom surface defining a bottom surface of said mat, said contoured bottom surface and having an egg crate configuration defining, an array of peaks and valleys, the depth and pitch of the peaks and valleys providing the mat with a selected compression characteristic under load; and
   a second layer overlying the top surface of said first layer and defining a generally flat top surface of said mat, wherein said first and second layers are formed of sound absorbing material so that impact and/or vibration energy applied to said mat is inhibited from propagating to structure surrounding said mat.

8. A noise and vibration mitigating mat according to claim 7 wherein the contoured bottom surface has variations in thickness depth and pitch of the peaks and valleys varies over said bottom surface.

9. A noise and vibration mitigating mat according to claim 7 wherein said first and second layers are formed of recycled rubber product.

10. A noise and vibration mitigating mat according to claim 9 wherein the first and second layers are each formed of Styrenebutadiene Rubber (SBR) and natural rubber mixed with a polyurethane to form a plurality of voids therein.

11. A noise and vibration mitigating map according to claim 7 wherein said second layer is selected from the group consisting of geotextile, fabric, polyethylene plastic, polypropylene plastic and asphalt mastic material.

12. A noise and vibration mitigating mat according to claim 7 further comprising at least one intermediate layer disposed between said first and second layers.

13. A noise and vibration mitigating map according to claim 12 wherein said first and second layers are formed of Styrenebutadiene Rubber and natural rubber mixed with polyurethane.

14. A noise and vibration mitigating map according to claim 13 wherein said intermediate layer is selected from the group consisting of geotextile, fabric, polyethylene plastic, polypropylene plastic and asphalt mastic material.

* * * * *